J. W. SHANNON.
Gas-Regulators.
No. 218,325.        Patented Aug. 5, 1879.
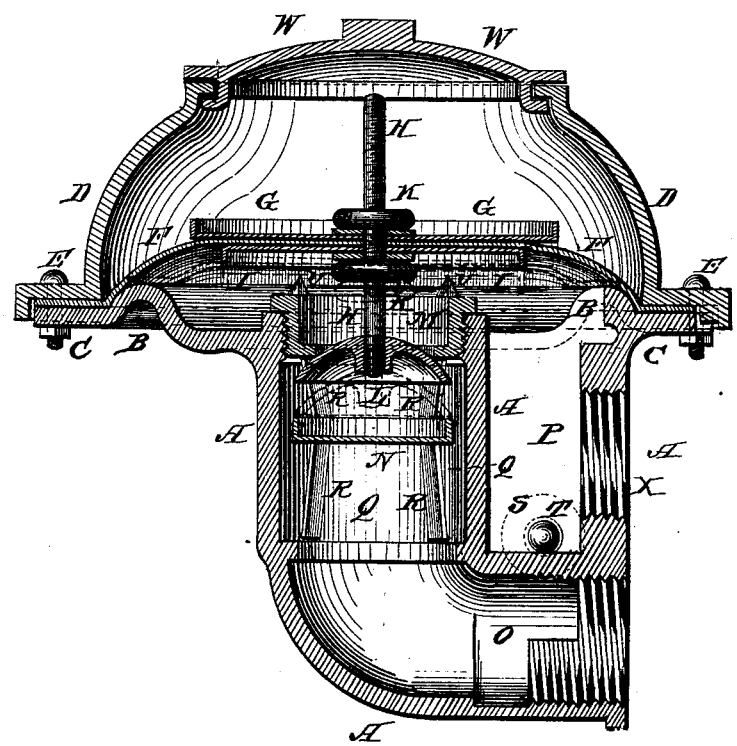

UNITED STATES PATENT OFFICE.

JAMES W. SHANNON, OF PHILADELPHIA, PENNSYLVANIA.

IMPROVEMENT IN GAS-REGULATORS.

Specification forming part of Letters Patent No. 218,325, dated August 5, 1879; application filed October 23, 1878.

*To all whom it may concern:*

Be it known that I, JAMES W. SHANNON, of the city and county of Philadelphia and State of Pennsylvania, have invented a new and useful Improvement in Gas-Regulators for controlling the flow and pressure of illuminating-gas in its passage through tubes for consumption; and I do hereby declare the following to be a sufficiently full, clear, and exact description of the said invention to enable others skilled in the art to make and use the same.

The drawing represents the invention in central vertical section.

My invention relates to that class of regulators in which a diaphragm distended or raised by the pressure of gas closes a valve admitting gas to the chamber covered by it, and from which gas passes to the pipes from which it is consumed; and my improvements may be briefly stated to consist of an improved form of body or bottom for supporting and guiding the diaphragm, an improved construction of plates for stiffening the center of the diaphragm and attaching the valve-stem, an improved device for directing the current of gas under the valve, an improved form of inlet and outlet pipe, by which moisture or other condensed impurities in the gas are trapped or detained, so that they may be drawn off, and an improved mode of supporting the diaphragm and valve when open, so that it cannot become fouled or stuck, all of which devices are so combined as by their co-operation to effect and maintain an equal pressure of gas in the pipe leading to the burners.

A represents the body of the regulator, provided with a flange, C, to which is secured the cover D by means of the screws E. A plug, W, closes the top of the cover D.

F is a diaphragm, made of leather or other flexible material, molded into the shape of a dome, and held at its outer margin between the flanges C of the body A and the flange of the cover D by the screws E.

A raised ring, convex on its upper surface, as shown at B, is formed on the body A of the regulator, and supports the diaphragm F when not inflated, so that it assumes the position shown in the dotted lines, and prevents any abrupt bending and consequent breaking of the diaphragm at the line where it is pinched between the flange C and the cover D. Upon the upper side of the diaphragm F is placed a disk of metal, G, having a rim raised upon its upper surface, and serves a threefold purpose. It answers for a receptacle for weight in adjusting the regulator, it supports the center of the diaphragm F when inflated, and affords a means for attachment of the valve-stem H.

Underneath the diaphragm F, and concentric with it and the disk G, is another smaller disk, I, which is clamped tightly against the diaphragm F by means of the nuts K K on the valve-stem H. A rim is formed turned downward on the disk I, so as to avoid any abrupt angle in contact with the diaphragm F, and, being made smaller than the disk G, guides the diaphragm F so that during its inflation the area in contact with and operating to raise the valve is gradually changed, and the fluttering or pulsation of the valve is avoided.

The valve L is a segment of a sphere, and closes upward against the seat M, which is of such form as to present merely a line or edge for contact when closed against the valve, thus avoiding all risk of adhesion between these parts, which occurs when surfaces are presented and they become coated with tar from the gas.

Under the valve L in the expanded chamber Q Q is placed a disk, N, supported by frames or legs R, and serves to direct the current of gas entering the inlet O, so that it passes to the space around the valve L instead of impinging upon its under side.

Upon the upper side of the valve-seat M are formed projecting pointed pins or pillars U, which serve to sustain the weight of the diaphragm F, plates G and I, valve L, and valve-stem H, with the nuts K K, when the diaphragm is not inflated, and thus preserves a free passage for the gas between the seat M and plate I without offering such surfaces for contact as would be possible to adhere when coated with tar.

The gas is discharged from the regulator by the outlet-pipe P, having a chamber, S, provided with a drip-hole and plug, T, below the lever of the discharging-orifice X, by which any condensed fluids can be retained and emptied without reaching and fouling the diaphragm and valve.

I do not claim any of the devices I have described separately and singly; but

What I claim as my invention is—

The combination of the dome-shaped diaphragm F, clamped centrally by the unequally-sized plates G and I, convex supporting-ring B, valve L, and valve-seat M, provided with supporting-points U, cover D, and body A, provided with parallel horizontal inlet and outlet passages O and P, and disk N, as and for the purpose set forth.

J. W. SHANNON.

Witnesses:
J. DANIEL EBY,
WM. C. HEAD.